United States Patent
Hoshi (10) Patent No.: US 11,187,828 B2
(45) Date of Patent: Nov. 30, 2021

(54) PLASTIC LENS, SPECTACLE LENS, AND SPECTACLES

(71) Applicant: HOYA LENS THAILAND LTD., Thanyaburi (TH)

(72) Inventor: Yuji Hoshi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 36 days.

(21) Appl. No.: 15/718,283

(22) Filed: Sep. 28, 2017

(65) Prior Publication Data

US 2018/0017711 A1 Jan. 18, 2018

Related U.S. Application Data

(63) Continuation of application No. PCT/JP2016/060703, filed on Mar. 31, 2016.

(30) Foreign Application Priority Data

Mar. 31, 2015 (JP) .............................. JP2015-071028

(51) Int. Cl.
*G02B 1/04* (2006.01)
*G02C 7/02* (2006.01)
(Continued)

(52) U.S. Cl.
CPC .............. *G02B 1/041* (2013.01); *C08F 20/26* (2013.01); *C08F 220/28* (2013.01);
(Continued)

(58) Field of Classification Search
CPC ....................................................... G02B 1/041
See application file for complete search history.

(56) References Cited

U.S. PATENT DOCUMENTS 4,215,010 A * 7/1980 Hovey ................. C07D 498/10
252/586
4,721,377 A * 1/1988 Fukuda .................... G02B 1/04
351/159.01

(Continued)

FOREIGN PATENT DOCUMENTS

CN 102112528 A 6/2011
CN 104254584 A 12/2014
(Continued)

OTHER PUBLICATIONS

Chaplin—Infrared Spectroscop1—2013 (Year: 2013).*
(Continued)

*Primary Examiner* — Callie E Shosho
*Assistant Examiner* — John Vincent Lawler
(74) *Attorney, Agent, or Firm* — Oliff PLC (57) ABSTRACT

Provided is a plastic lens obtained by curing a curable composition including a curable compound, wherein the curable composition includes 50 parts by mass or more of a (meth)acrylic curable compound relative to 100 parts by mass of the total amount of the curable compound, and in the plastic lens, the absorbance ratio of the maximum absorbance Abs1 at a wave number of 1680 to 1620 $cm^{-1}$ relative to the maximum absorbance Abs2 at a wave number of 1800 to 1690 $cm^{-1}$ in an infrared spectrum obtained by measurement with a Fourier transform infrared spectrophotometer is 7.0% or less, as calculated by using the following Formula 1:

Absorbance ratio (%)=(Abs1/Abs2)×100.

19 Claims, 3 Drawing Sheets

VERTICAL AXIS: ABSORBANCE (Abs),
HORIZONTAL AXIS: WAVE NUMBER ($cm^{-1}$)

(51) Int. Cl.
*C08F 20/26* (2006.01)
*C08F 222/10* (2006.01)
*C08F 220/28* (2006.01)
*C08K 5/00* (2006.01)

(52) U.S. Cl.
CPC .......... *C08F 222/10* (2013.01); *C08K 5/0041* (2013.01); *G02C 7/02* (2013.01); *C08F 220/285* (2020.02)

(56) References Cited

U.S. PATENT DOCUMENTS

| | | | | |
|---|---|---|---|---|
| 5,183,870 | A * | 2/1993 | Fukushima | C08F 220/10 526/273 |
| 5,583,191 | A * | 12/1996 | Kawai | C08F 220/28 526/320 |
| 5,989,628 | A * | 11/1999 | Haga | G02B 1/041 427/164 |
| 2006/0182977 | A1* | 8/2006 | Takenaka | C08F 222/1006 428/423.1 |
| 2007/0231566 | A1* | 10/2007 | Yoneyama | G02B 1/105 428/331 |
| 2008/0058444 | A1* | 3/2008 | Tanaka | C08F 222/1006 523/135 |
| 2009/0162541 | A1* | 6/2009 | Kimura | C08K 5/18 427/160 |
| 2010/0230650 | A1* | 9/2010 | Nagoh | C08F 2/44 252/586 |
| 2011/0091743 | A1* | 4/2011 | Obu | C08J 7/042 428/689 |
| 2012/0219806 | A1* | 8/2012 | Miyai | B32B 27/28 428/424.4 |
| 2014/0295183 | A1* | 10/2014 | Yamagata | C09J 7/22 428/355 CN |
| 2015/0037578 | A1* | 2/2015 | Kataoka | C09J 7/385 428/354 |

FOREIGN PATENT DOCUMENTS

| | | |
|---|---|---|
| JP | 2004-333697 A | 11/2004 |
| JP | 2009-108170 A | 5/2009 |
| JP | 2013-241577 A | 12/2013 |
| WO | 2009/075388 A1 | 6/2009 |
| WO | 2009/146509 A1 | 12/2009 |
| WO | 2013/161642 A1 | 10/2013 |

OTHER PUBLICATIONS

Jul. 5, 2016 International Search Report issued in International Patent Application No. PCT/JP2016/060703.
Oct. 3, 2017 International Preliminary Report on Patentability issued in International Patent Application No. PCT/JP2016/060703.
Mar. 2, 2020 Office Action issued in Chinese Patent Application No. 201680017458.5.

* cited by examiner

FIG. 1

EXAMPLE 1

EXAMPLE 2

EXAMPLE 3

VERTICAL AXIS: ABSORBANCE (Abs),
HORIZONTAL AXIS: WAVE NUMBER (cm$^{-1}$)

FIG. 2

EXAMPLE 4

EXAMPLE 5

EXAMPLE 6

VERTICAL AXIS: ABSORBANCE (Abs),
HORIZONTAL AXIS: WAVE NUMBER (cm$^{-1}$)

FIG. 3

COMPARATIVE EXAMPLE 1

COMPARATIVE EXAMPLE 2

COMPARATIVE EXAMPLE 3

VERTICAL AXIS: ABSORBANCE (Abs),
HORIZONTAL AXIS: WAVE NUMBER ($cm^{-1}$)

PLASTIC LENS, SPECTACLE LENS, AND SPECTACLES

CROSS-REFERENCES TO RELATED PATENT APPLICATIONS

This application is a Continuation of PCT International Application No. PCT/JP2016/060703 filed on Mar. 31, 2016, which was published under PCT Article 21(2) in Japanese and claims priority under 35 U.S.C § 119 (a) to Japanese Patent Application No. 2015-71028 filed on Mar. 31, 2015. The above applications are hereby expressly incorporated by reference, in their entirety, into the present application.

TECHNICAL FIELD

The present disclosure relates to a plastic lens, a spectacle lens, and spectacles having the spectacle lens.

BACKGROUND ART

Compared to glasses, plastics have an advantage that they are light weight and hardly breakable. As such, a molded article obtained by molding plastics into a lens shape (plastic lens) is widely used as various lenses including a spectacle lens.

As a method for obtaining a plastic lens according to molding of plastics into a lens shape, a cast polymerization method by which a curable composition containing a curable compound (also referred to as a raw material liquid for plastic lens) is subjected to polymerizing and curing in a molding die can be mentioned (see, paragraphs [0224] to [0225] and Examples 1 to 10 of the publication of JP 2013-241577 A (entire contents of which are hereby incorporated by reference), for example).

SUMMARY OF THE INVENTION

As described in the publication of JP 2013-241577 A, for example, a (meth)acrylic curable compound is widely used for a curable composition. Herein, the (meth)acrylic curable compound is to mean a curable compound which has, in one molecule, at least one or more polymerizable group selected from a group consisting of an acryloyloxy group, a methacryloyloxy group, an acryloyl group, and a methacryloyl group (hereinbelow, also referred to as a "(meth)acrylic polymerizable group"). By polymerizing and curing the curable composition containing such (meth)acrylic curable compound according to heating treatment in a molding die or the like followed by releasing from the molding die, a plastic lens formed by curing of the curable composition can be obtained.

However, according to determination by the inventor of the present disclosure, it was clearly shown that a plastic lens formed by curing of a curable composition containing a (meth)acrylic curable compound sometimes has an occurrence of tiny irregularities (also described as "surface damage" hereinbelow) on a lens surface after the lens is extracted from a molding die following the cast polymerization. Such surface damage is a cause of having impaired outer appearance quality of a plastic lens, and in severe cases, optical homogeneity is affected by it. As such, reduction of the surface damage is desired.

An aspect of the present disclosure is to provide a plastic lens obtained by curing a curable composition containing a (meth)acrylic curable compound in which the plastic lens has high quality with suppressed occurrence of surface damage.

During the process of repeating determinations to provide the above plastic lens, the inventor of the present disclosure found that an occurrence of the surface damage is caused by adhesion of debris which is generated by partial peeling of a part of the outermost surface region or an end part of a cured product, which has been cured in a molding die, during release after cast polymerization, or debris which is generated during rounding process after release (outer periphery molding processing) on a surface of a lens, for example. More specifically, as a result of the determination by the inventor of the present disclosure, local swelling of a debris-adhered part over time was found to be the cause of the tiny irregularities (surface damage) that are described above. Such local swelling is continuously present on a surface of a plastic lens even when the debris is removed by cleaning or the like, and it causes a decrease in outer appearance quality or optical homogeneity of a plastic lens.

In this connection, the inventor of the present disclosure conducted further intensive studies based on the above finding, and as a result, newly found a plastic lens according to an aspect of the disclosure as follows:

a plastic lens obtained by curing a curable composition containing a curable compound, in which the curable composition contains 50 parts by mass or more of a (meth) acrylic curable compound relative to 100 parts by mass of the total amount of the curable compound, and in the plastic lens, the absorbance ratio of the maximum absorbance Abs1 at a wave number of 1680 to 1620 $cm^{-1}$ relative to the maximum absorbance Abs2 at a wave number of 1800 to 1690 $cm^{-1}$ in an infrared spectrum obtained by measurement with a Fourier transform infrared spectrophotometer (hereinbelow, also described as "FT-IR") is 7.0% or less, as calculated by using the following Formula 1:

$$\text{Absorbance ratio (\%)}=(Abs1/Abs2)\times 100 \qquad \text{Formula 1.}$$

Namely, it was newly found out by the inventor of the present disclosure that, even with adhesion of debris as described above, the plastic lens mentioned above hardly allows an occurrence of tiny irregularities on a lens surface (surface damage), and thus an aspect of the present disclosure is completed by it.

With regard to the above, it is speculated by the inventor of the present disclosure that the absorbance ratio obtained by above Formula 1 can be an indicator of progress degree of the polymerization of a curable composition containing a (meth)acrylic curable compound. Furthermore, it is newly found out based on the intensive studies by the inventor of the present disclosure that, as progress of the polymerization is made such that the absorbance ratio is 7.0% or less, the aforementioned surface damage can be reduced on a surface of a plastic lens. Furthermore, according to the studies by the inventor of the present disclosure, when the case of adding, on a surface of a plastic lens with the absorbance ratio of 7.0% or less, debris that is generated by partial peeling of the plastic lens or debris that is generated during rounding process is compared to the case of adding debris that is collected from part of other plastic lens with the absorbance ratio of more than 7.0%, it was confirmed that a phenomenon of having an occurrence of tiny irregularities on the lens surface (surface damage), which is caused by local swelling of a debris-adhered part on a surface of a plastic lens, is more significant in the latter case. This is an unexpected new finding which has been found during the repetition of intensive studies by the inventor of the present disclosure. Based on this, it is speculated by the inventor of the present disclosure that deformation of a surface of a plastic lens by debris derived from the plastic lens itself, in which progress of polymerization is insufficient and non-polymerized components are included in a large amount, is the cause of an occurrence of the aforementioned surface damage. It is suggested by the above phenomenon that the suppressed occurrence of a surface damage in a plastic lens with the absorbance ratio of 7.0% or less is not based on a simple phenomenon that deformation by debris is suppressed as the surface hardness increases according to progress of polymerization.

However, the above is just a speculation made by the inventor of the present disclosure, and the present disclosure is not limited by it at all.

In one aspect, the (meth)acrylic curable compound includes component A1: polyalkylene glycol (meth)acrylic curable compound in which the average addition mole number of an alkylene oxide chain selected from ethylene oxide chain and propylene oxide chain is 10 or less.

In one aspect, the curable composition includes the component A1 at 20 parts by mass or more relative to 100 parts by mass of the total amount of the curable compound.

In one aspect, the (meth)acrylic curable compound includes component A2: polyalkylene glycol (meth)acrylic curable compound in which the average addition mole number of an alkylene oxide chain selected from ethylene oxide chain and propylene oxide chain is within a range of 11 to 30.

In one aspect, the curable composition includes the component A2 at 5 to 50 parts by mass relative to 100 parts by mass of the total amount of the curable compound.

In one aspect, the plastic lens is a photochromic lens containing a photochromic pigment. By adding a photochromic pigment to the curable composition for obtaining a plastic lens, it becomes possible to obtain a plastic lens containing a photochromic pigment (photochromic lens). According to the photochromic lens, as the photochromic pigment shows color exhibition/discoloration in response to light, a plastic lens can be provided with a property which enables exhibition of the same anti-glare property as a color lens in bright outdoor environments but exhibits discoloration to regain light transmitting property when it is moved to indoor environments.

In one aspect, the curable composition additionally includes a curable compound containing an ethylenically unsaturated double bond other than the (meth)acrylic curable compound.

In one aspect, the curable composition additionally includes a radical polymerization initiator.

In one aspect, the curable composition includes the radical polymerization initiator at 1.00 to 6.00 parts by mass relative to 100 parts by mass of the total amount of the curable compound.

In one aspect, the radical polymerization initiator is an organic peroxide.

In one aspect, the radical polymerization initiator is a peroxyester compound.

In one aspect, the radical polymerization initiator includes component B1: a radical polymerization initiator of which 10 hour half life temperature is 30 degrees or higher but lower than 60 degrees, and component B2: a radical polymerization initiator of which 10 hour half life temperature is 60 degrees or higher but 80 degrees or lower.

In one aspect, the curable composition includes the component B1 at 0.50 to 5.00 parts by mass and the component B2 at 0.01 to 1.00 part by mass relative to 100 parts by mass of the total amount of the curable compound.

Another aspect of the present disclosure relates to a spectacle lens including at least a lens base wherein the lens base is the above-described plastic lens.

Another aspect of the present disclosure relates to spectacles including the spectacle lens and a frame having the spectacle lens mounted in.

According to an aspect of the present disclosure, it is possible to provide a high quality plastic lens with suppressed occurrence of surface damage, a spectacle lens including the plastic lens, and spectacles equipped with the spectacle lens.

DESCRIPTION OF EMBODIMENTS

[Plastic Lens]

The plastic lens according to an aspect of the present disclosure is a plastic lens obtained by curing a curable composition containing a curable compound, and it is a plastic lens in which the curable composition contains 50 parts by mass or more of a (meth)acrylic curable compound relative to 100 parts by mass of the total amount of the curable compound. It is also a plastic lens in which the absorbance ratio of the maximum absorbance Abs1 at a wave number of 1680 to 1620 cm$^{-1}$ relative to the maximum absorbance Abs2 at a wave number of 1800 to 1690 cm$^{-1}$ in an infrared spectrum obtained by measurement with a Fourier transform infrared spectrophotometer (FT-IR) is 7.0% or less, as calculated by using the following Formula 1

$$\text{Absorbance ratio (\%)}=(\text{Abs1}/\text{Abs2})\times100 \quad \text{Formula 1.}$$

Hereinbelow, the plastic lens is explained in greater detail.

<Absorbance Ratio Calculated by Using Formula 1>

According to the plastic lens according to an aspect of the present disclosure, the absorbance ratio of the maximum absorbance Abs1 at a wave number of 1680 to 1620 cm$^{-1}$ relative to the maximum absorbance Abs2 at a wave number of 1800 to 1690 cm$^{-1}$ in an infrared spectrum obtained by measurement with FT-IR is 7.0% or less, as calculated by using the following Formula 1. The FT-IR measurement is carried out based on KBr method by using a measurement sample obtained by cutting part of the plastic lens as a measurement subject. The absorbance peak at a wave number of 1680 to 1620 cm$^{-1}$ is a peak derived from an ethylenically unsaturated double bond which is contained in various curable compounds including a (meth)acrylic curable compound. Furthermore, the ethylenically unsaturated double bond means a carbon-carbon double bond and it is included in polymerizable groups which are contained in various polymerizable compositions like (meth)acrylic polymerizable group contained in a (meth)acrylic curable composition. Intensity of this peak (the maximum absorbance Abs1) decreases as the ethylenically unsaturated double bond responding to polymerization reaction increases. On the other hand, the absorbance peak at a wave number of 1800 to 1690 cm$^{-1}$ is a peak derived from the carbonyl group (—(C=O)—) included in the (meth)acrylic polymerizable group which is contained in a (meth)acrylic curable compound. Because the carbonyl group does not contribute to the polymerization reaction, the peak intensity at a wave number of 1800 to 1690 cm$^{-1}$ (the maximum absorbance Abs2) has a constant value regardless of progress of the polymerization. As such, the absorbance ratio of the maximum absorbance Abs1 relative to the maximum absorbance Abs2 as calculated by using Formula 1 means that, smaller the value of absorbance ratio is, more progress of the polymerization is obtained. In addition, the aspect that an occurrence of the above-explained surface damage can be suppressed by allowing the polymerization of a plastic lens to the extent that the absorbance ratio is 7.0% or less is newly found according to the intensive studies by the inventor of the present disclosure. The speculation by the inventor of the present disclosure regarding this point is the same as those described above. According to the plastic lens according to an aspect of the present disclosure, the absorbance ratio may be 6.0% or less, 5.0% or less, 4.0% or less, or 3.5% or less. The absorbance ratio is 2.0% or more, for example. However, from the viewpoint of suppressing the surface damage, it can be also less than 2.0%. The absorbance ratio can be lowered by having the curable composition with composition for easy progress of the polymerization, or by promoting the polymerization based on polymerization conditions.

<Curable Composition>

(Composition of Curable Composition)

The plastic lens according to an aspect of the present disclosure is obtained by curing a curable composition containing 50 parts by mass or more of a (meth)acrylic curable compound relative to 100 parts by mass of the total amount of the curable compound. The curable composition contains a (meth)acrylic curable compound in an amount of 50 parts by mass or more relative to 100 parts by mass of the total amount of the curable compound. Progress of the polymerization of the curable composition can be evaluated by using the above-described absorbance ratio as an indicator. Relative to 100 parts by mass of the total amount of the curable compound in the curable composition, the (meth)acrylic curable compound may be contained at 70 parts by mass or more, 80 parts by mass or more, 90 parts by mass or more, or 95 parts by mass or more.

The curable composition may contain a curable compound other than the (meth)acrylic curable compound. In that case, content of the (meth)acrylic curable compound can be, for example, 99 parts by mass or less or 98 parts by mass or less relative to 100 parts by mass of the total amount of the curable compound.

However, as described above, according to one embodiment, the plastic lens according to an aspect of the present disclosure can be a photochromic lens. In the case of a photochromic lens, from the viewpoint of enhancing the responsiveness to light, the content of the curable compound other than the (meth)acrylic curable compound to be included in the curable composition may be within a range of 0.5 to 20 parts by mass, or within a range of 1 to 10 parts by mass relative to 100 parts by mass of the content of the (meth)acrylic curable compound. Furthermore, even in a case in which the plastic lens according to an aspect of the present disclosure is not a photochromic lens, the content of the curable compound other than the (meth)acrylic curable compound to be included in the curable composition may be within the aforementioned range.

Furthermore, with regard to the curable composition, it is also possible that every polymerizable compound contained in the composition is a (meth)acrylic curable compound. Namely, the content of a (meth)acrylic curable compound in the curable composition can be 100 parts by mass relative to 100 parts by mass of the total amount of the curable compound.

The (meth)acrylic curable compound contained in the curable composition can be either one type or two or more types. It may be two or more types. In a case in which two or more types of a (meth)acrylic curable compound are contained, the aforementioned content indicates the total content thereof. Furthermore, this holds true also for the content of other components which may be contained in the curable composition, in which other components will be explained in detail in the followings.

The (meth)acrylic curable compound contained in the curable composition may be a polyfunctional compound which includes two or more (meth)acrylic polymerizable groups in one molecule. Number of the (meth)acrylic polymerizable group to be included in one molecule of the (meth)acrylic curable compound may be 2 to 6, or 2 or 3. In a case in which the (meth)acrylic curable compound is a polyfunctional compound, the (meth)acrylic polymerizable groups included in one molecule may have the same structure or a different structure.

((Meth)Acrylic Curable Compound)

The curable composition may contain, as a (meth)acrylic curable compound, a polyalkylene glycol (meth)acrylic curable compound which has at least an alkylene oxide chain (hereinbelow, described as "EO/PO chain") selected from a group consisting of an ethylene oxide chain (EO chain) and a propylene oxide chain (PO chain). Herein, the alkylene oxide chain represents any one of the followings:

in which R is a hydrogen atom or a methyl group, and those having hydrogen atom as R correspond to an ethylene oxide chain and those having methyl group as R correspond to a propylene oxide chain. Furthermore, n and m each independently represents an integer of 1 or more. Furthermore, when n is an integer of 2 or more, R present in number of n can be the same or different from each other. This holds true also for m.

In the curable composition, only 1 kind of the polyalkylene glycol (meth)acrylic curable compound having an EO/PO chain may be contained. It is also possible that two or more kinds thereof with different structure are contained therein. Two or more kinds thereof with different structure may be contained therein. The content of the polyalkylene glycol (meth)acrylic curable compound having an EO/PO chain relative to 100 parts by mass of the total amount of the curable compound contained in the composition may be 25 parts by mass or more, or within a range of 40 to 80 parts by mass. Furthermore, in the present disclosure and also in the present specification, if two or more kinds with different structure are contained as a certain component, the content described for that component indicates their total content.

From the viewpoint of having further suppression of a surface damage, the curable composition may at least contain, as a polyalkylene glycol (meth)acrylic curable compound, a compound in which average addition mole number of an EO/PO chain is 10 or less. Herein, the average addition mole number of an EO/PO chain indicates the total number of an EO/PO chain included in one molecule of a compound. For example, with regard to an EO/PO chain, the average addition mole number of an EO/PO chain of a compound which has a partial structure represented by the above (a) is n, the average addition mole number of an EO/PO chain of a compound which has a partial structure represented by the above (b) is m, the average addition mole number of an EO/PO chain of a compound which has a partial structure represented by the above (a) and a partial structure represented by the above (b) is n+m, the average addition mole number of an EO/PO chain of a compound which has A number of a partial structure represented by the above (a) is A×n, and the average addition mole number of an EO/PO chain of a compound which has A number of a partial structure represented by the above (b) is A×m. The average addition mole number is a value obtained by 1H-NMR.

From the viewpoint of having further suppression of a surface damage, the curable composition may contain a polyalkylene glycol (meth)acrylic curable compound in which the average addition mole number of an EO/PO chain is 10 or less (component A1). From the viewpoint of having even further suppression of a surface damage, the average addition mole number of an EP/PO chain of the component A1 may be within a range of 2 to 9.

From the viewpoint of having even further suppression of a surface damage, the content of the component A1 in the curable composition may be 20 parts by mass or more, 30 parts by mass or more, or 40 parts by mass or more relative to 100 parts by mass of the total amount of the curable compound contained in the curable composition. From the viewpoint of enhancing the mechanical strength of the plastic lens according to an aspect of the present disclosure, the content of the component A1 in the curable composition may be 80 parts by mass or less, 70 parts by mass or less, or 60 parts by mass or less relative to 100 parts by mass of the total amount of the curable compound contained in the curable composition.

Meanwhile, in a case in which the plastic lens according to an aspect of the present disclosure is a photochromic lens, the curable composition may contain, as a polyalkylene glycol (meth)acrylic curable compound having an EO/PO chain, a compound which has higher average addition mole number than the component A1. Such compound may be contained from the viewpoint of enhancing the light responsiveness of a photochromic lens. Such compound may be a polyalkylene glycol (meth)acrylic curable compound in which the average addition mole number of an EO/PO chain is within a range of 11 to 30 (component A2). The content of the component A2 may be 5 parts by mass or more, 10 parts by mass or more, or 20 parts by mass or more relative to 100 parts by mass of the total amount of the curable compound contained in the curable composition. Furthermore, from the viewpoint of reducing a surface damage or ensuring lens rigidity of the plastic lens according to an aspect of the present disclosure, the content of the component A2 in the curable composition may be 50 parts by mass or less, 40 parts by mass or less, or 30 parts by mass or less relative to 100 parts by mass of the total amount of the curable compound contained in the curable composition.

With regard to the details including specific examples of the polyalkylene glycol (meth)acrylic curable compound having an EO/PO chain described above, reference can be made to paragraphs [0166] to [0187] of JP 2013-241577 A and also the Examples of the same publication.

(Other Curable Compound)

As a curable compound which may be contained in the curable composition, various (meth)acrylic curable compounds other than the aforementioned polyalkylene glycol (meth)acrylic curable compound having an EO/PO chain can be used.

Examples of a (meth)acrylic curable compound include a (meth)acryl-amide based curable compound which has an amide group (—NH—(C=O)—) together with a (meth)acrylic polymerizable group. The (meth)acryl-amide based curable compound may have 2 to 6 (meth)acrylic polymerizable groups in one molecule, or it may have 2 to 6 amide groups in one molecule. Examples of those (meth)acryl-amide based curable compounds include a (meth)acryl-amide polymerizable monomer represented by General Formula (1), which is described in JP 2013-241577 A. With regard to the details thereof, reference can be made to paragraphs [0049] to [0120] of JP 2013-241577 A and also the Examples of the same publication.

The content of the (meth)acryl-amide based curable compound in the curable composition may be within a range of 10 to 50 parts by mass, or within a range of 15 to 30 parts by mass relative to 100 parts by mass of the total amount of the curable compound contained in the curable composition.

Examples of a (meth)acrylic curable compound also include a compound represented by General Formula (8), which is described in JP 2013-241577 A. With regard to the details thereof, reference can be made to paragraphs [0182] to [0187] of JP 2013-241577 A and also the Examples of the same publication. It is also possible to use a compound represented by General Formula (9), which is described in JP 2013-241577 A. With regard to the details thereof, reference can be made to paragraphs [0188] to [0195] of JP 2013-241577 A and also the Examples of the same publication. Furthermore, a publicly well-known urethane (meth)acrylate can be also used as a (meth)acrylic curable compound.

Furthermore, it is also possible to use various kinds of a known curable compound containing ethylenically unsaturated double bond as a curable compound other than the (meth)acrylic curable compound. Specific examples thereof include substituted or unsubstituted styrene and a prepolymer of substituted or unsubstituted styrene. Herein, the prepolymer indicates a multimer that is a polymer of substituted or unsubstituted styrene but contains an ethylenically unsaturated double bond and is capable of undergoing a polymerization reaction. The a methylstyrene dimer which will be described later corresponds to such prepolymer. Furthermore, examples of a substituent group substituted on styrene include a linear or branched alkyl group having 1 to 10 carbon atoms. Furthermore, the content of the curable compound other than the (meth)acrylic curable compound to be contained in the curable composition is the same as described above. As for the curable compound other than the (meth)acrylic curable compound, various vinyl bond-containing compounds or the like can be used.

<Other Components>

The curable composition may contain, in addition to the curable compound explained in the above, 1 or more kinds of a known additive or solvent which can be contained in a curable composition used for manufacture of a plastic lens. Hereinbelow, specific examples of those components are described but the components which may be contained in the curable composition are not limited to the following specific examples.

(Radical Polymerization Initiator)

The curable composition may contain a polymerization initiator for initiating the polymerization of the curable compound. Because the polymerization of the (meth)acrylic curable compound can be initiated by a radical polymerization initiator, it is possible for the curable composition to contain a radical polymerization initiator.

As for the radical polymerization initiator, various kinds of a radical polymerization initiator that are either commercially available or can be synthesized by a known method can be used. The radical polymerization initiator can be either a thermal radical polymerization initiator which generates radicals by heat or a photo radical polymerization initiator which generates radicals upon irradiation with light. In general, for manufacturing a plastic lens based on cast polymerization, thermal polymerization may be conducted in terms of processes. As such, the radical polymerization initiator to be contained in the curable composition may be a thermal radical polymerization initiator.

The radical polymerization initiator contained in the curable composition may be an organic peroxide. The organic peroxide has a —O—O— bond and can initiate radical polymerization based on oxygen radical generation caused by heat. Examples of the organic peroxide include a peroxyester compound such as t-butylperoxyneodecanoate, 1,1,3,3,-tetramethylbutyl-peroxy-2-ethylhexanoate, t-butylperoxypyvalate, t-butylperoxyisobutyrate, t-butylperoxyacetate, cumylperoxyneodecanoate, t-butylperoxyoctoate, t-butylperoxyisopropylcarbonate, cumylperoxyoctoate, t-hexylperoxyneodecanoate, t-hexylperoxypyvalate, or t-butylperoxyneohexanoate, a peroxyketal compound such as 1,1-bis(t-butylperoxy)3,3,5-trimethylcyclohexane, 1,1-bis(t-butylperoxy)cyclohexane, 2,2-bis(t-butylperoxy)octane, or 2,2-bis(t-butylperoxy)butane, a diacylperoxide compound such as acetyl peroxide, isobutyryl peroxide, octanoyl peroxide, lauroyl peroxide, benzoyl peroxide, or m-toluoyl peroxide, and a peroxydicarbonate compound such as diisopropylperoxydicarbonate or di-n-propylperoxydicarbonate.

As an indicator of the reactivity of a radical polymerization initiator, 10 hour half life temperature is known. The 10 hour half life temperature indicates a temperature at which an active oxygen amount of a radical polymerization initiator is reduced to the half by 10 hours. It is a value known in the literatures and can be measured by a known method. From the viewpoint of controlling the speed of polymerization reaction, the curable composition may contain two or more kinds of a radical polymerization initiator that are different from each other in terms of 10 hour half life temperature. The curable composition may contain a radical polymerization initiator of which 10 hour half life temperature is 30 degrees or higher but lower than 60 degrees (component B1) and a radical polymerization initiator of which 10 hour half life temperature is 60 degrees or higher but 80 degrees or lower (component B2). Furthermore, the radical polymerization initiators with different 10 hour half life temperature may be an organic peroxide, or a peroxyester compound.

The content of the radical polymerization initiator in the curable composition may be within a range of 1.00 to 6.00 parts by mass, or within a range of 1.00 to 1.50 parts by mass relative to 100 parts by mass of the total amount of the curable compound contained in the curable composition. Furthermore, in a case in which the component B1 and the component B2 are included as a radical polymerization initiator, the content of the component B1 may be within a range of 0.50 to 5.00 parts by mass, or within a range of 0.70 to 3.00 parts by mass, and the content of the component B2 may be within a range of 0.10 to 1.00 part by mass, or within a range of 0.20 to 0.60 part by mass relative to 100 parts by mass of the total amount of the curable compound contained in the curable composition of the component B1.

(Photochromic Pigment)

As it has been described above, according to one embodiment, the plastic lens according to an aspect of the present disclosure can be a photochromic lens containing a photochromic pigment (photochromic compound). The photochromic pigment is not particularly limited as long as it exhibits photochromic performance. Any suitable one selected from known compounds that can be used for a photochromic lens can be used. For example, depending on desired coloration, 1 kind or a mixture of two or more kinds from photochromic compounds including spiropyran compound, chromene compound, spirooxazine compound, and fulgide compound can be used. With regard to the photochromic pigment, reference can be made to paragraphs [0201] to [0208] of JP 2013-241577 A. Furthermore, various kinds of a photochromic pigment are commercially available in recent years. Although many commercially available compounds have a rather unclear molecular structure, they can be also used in the present disclosure. In a case in which the curable composition contains a photochromic pigment, the content of the photochromic pigment can be suitably determined depending on the type of a photochromic pigment to be used. However, from the viewpoint of obtaining favorable photochromic performance, a photochromic pigment may be added to the curable composition, for example, within a range of 0.001 to 3.00 parts by mass, or within a range of 0.01 to 1.00 part by mass relative to 100 parts by mass of the total amount of the curable compound contained in the curable composition.

(Other Additives)

If necessary, various additives like heat stabilizer, antioxidant, UV absorbing agent, releasing agent, anti-static agent, other pigments, or the like may be additionally contained in the curable composition.

<Method for Producing Curable Composition>

The curable composition can be produced by mixing various components explained above either simultaneously or in turn in any order. The production method is not particularly limited, and any method known as a method for producing a curable composition which is used for manufacture of a plastic lens can be adopted.

<Method for Manufacturing Photochromic Lens>

The plastic lens according to an aspect of the present disclosure can be manufactured, for example, by a cast polymerization method using the curable composition. According to the cast polymerization, the curable composition is injected to a cavity of a molding die, in which the cavity is formed by closing a space created by 2 molds facing each other with predetermined space, and the polymerization reaction of the curable composition is allowed to occur within the cavity to yield a plastic lens. The above process can be carried out in the same manner as a common cast polymerization method. With regard to the details of the molding die to be used, reference can be made to paragraphs [0012] to [0014] of JP 2009-262480 A and FIG. 1 of the same publication (the entire contents of the publication are hereby incorporated by reference).

As it is commonly carried out for the cast polymerization method, the curable composition can be injected to a molding die cavity via an injection hole provided on the lateral side of a molding die. After the injection, according to polymerization of the curable composition, for example, by heating, the curable composition is cured (for example, radical polymerization) so that a molded article having an internal shape of the cavity transferred thereon can be obtained. The polymerization conditions are not particularly limited, and under the conditions for having a progress of the polymerization until the absorbance ratio calculated by using the aforementioned Formula 1 is 7.0% or less, the polymerization conditions can be suitably set depending on composition of the curable composition or type of the polymerization initiator. For example, it is possible that the molding die having the curable composition injected to the cavity can be heated for 10 to 72 hours or so at the heating temperature of 20 to 100 degrees, but the conditions are not limited thereto. Furthermore, the heating temperature described in the present disclosure and the present specification means the temperature of an atmosphere in which the molding die is placed. Furthermore, during the heating, the temperature can be raised at any temperature increase rate or the temperature can be lowered (cooled) at any temperature decrease rate.

Upon the completion of the polymerization reaction, the molded article (plastic lens) inside the cavity is released from the molding die. As it is commonly carried out for the cast polymerization method, by detaching in any order the top and bottom molds forming the cavity and a sealing member like gasket, the plastic lens can be released from the molding die. As described in the above, debris generated by partial peeling of a part of the outermost surface region or an end part of a cured product to be produced, or debris generated during rounding process may be the cause of a surface damage. However, according to the plastic lens according to an aspect of the present disclosure in which the absorbance ratio calculated by using the above Formula 1 is 7.0% or less, an occurrence of such surface damage can be suppressed.

The plastic leans released from a molding die can be used as a lens base of a spectacle lens. In general, the plastic lens used as a lens base of a spectacle lens can be subjected to, after release, to a post process including an annealing, a grinding process including rounding process or the like, a polishing process, and a process for forming a coating layer like primer coating layer for enhancing impact resistance, a hard coating layer for increasing surface hardness, or the like. Furthermore, various functional layers like anti-reflection layer and water repellent layer can be formed on top of a plastic lens. With regard to them, known technique can be applied without any limitations.

Furthermore, although an embodiment for manufacturing a plastic lens based on a cast polymerization method is explained in the above, the plastic lens according to an aspect of the present disclosure is not limited to those manufactured by the cast polymerization method. The plastic lens manufactured by a method other than cast polymerization method may also have an occurrence of debris according to processing like rounding process, and an occurrence of a surface damage caused by adhesion of such debris can be suppressed if the plastic lens is the plastic lens according to an aspect of the present disclosure.

[Spectacle Lens and Spectacles]

The spectacle lens according to an aspect of the present disclosure is a spectacle lens which includes at least a lens base, and it is a spectacle lens in which the lens base is the plastic lens according to an aspect of the present disclosure.

The spectacles according to an aspect of the present disclosure are spectacles which have the spectacle lens according to an aspect of the present disclosure and a frame having that spectacle lens mounted in.

The spectacle lens is the same as described in detail in the above. Other constitutions of the spectacles are not particularly limited, and known techniques can be applied thereto.

EXAMPLES

Hereinbelow, the present disclosure is explained in greater detail by way of Examples, but the present disclosure is not limited to the embodiments that are envisaged by Examples.

Examples 1 to 6 and Comparative Examples 1 to 3

After mixing and dissolving each component shown in the following Table 1, dissolved air was removed by degassing under vacuum to prepare a curable composition.

Thus-prepared curable composition was injected to a cavity of a molding die which consists of 2 pieces of a glass mold and plastic gasket. By heating (raising the temperature) it at temperature of 30 degrees to 95 degrees over 24 hours, the polymerization was carried out.

After the polymerization followed by release from the molding die, a rounding process (outer periphery molding process) was carried out. Thereafter, by keeping it for 1 hour or longer in an environment with atmospheric temperature of 100 degrees, removal of deformation (annealing) inside a lens, which occurs during the polymerization, was carried out and a plastic lens (photochromic lens) with meniscus shape was obtained.

Furthermore, for carrying out the evaluations that are described in the followings for each Example and Comparative example, plural pieces of a plastic lens were manufactured.

TABLE 1

| | | | Curable compound | Example 1 | Example 2 | Example 3 | Example 4 | Example 5 |
|---|---|---|---|---|---|---|---|---|
| Curable compound | (Meth)acrylic curable compound | Component A1 | Tripropylene glycol dimethacrylate (3PG), EO/PO average addition mole number 3 | 30 | 30 | 30 | 39 | 39 |
| | | | Polyethylene glycol diacrylate (9GA), EO/PO average addition mole number 9 | 14 | 14 | 14 | 19 | 19 |

TABLE 1-continued

|  |  |  | | | | | |
|---|---|---|---|---|---|---|---|
|  | Component A2 | Polyethylene glycol diacrylate (14GA), EO/PO average addition mole number 14 | 18 | 18 | 18 | 0 | 0 |
|  |  | 2,2 Bis[4 methacryloyloxypolyethoxyphenyl]propane (BPE900), EO/PO average addition mole number 17 | 5 | 5 | 5 | 0 | 0 |
|  | Other than component A1, A2 | (Meth)acryl-amide based monomer (AM-01) | 20 | 20 | 20 | 26 | 26 |
|  |  | Trimethylolpropane trimethacrylate (TMPT) | 10 | 10 | 10 | 13 | 13 |
|  |  | Glycidyl methacrylate (GMA) | 1 | 1 | 1 | 1 | 1 |
| Curable compound other than (meth)acrylic curable compound |  | α Methylstyrene (αMS) | 1 | 1 | 1 | 1 | 1 |
|  |  | α Methylstyrene dimer (MSD) | 1 | 1 | 1 | 1 | 1 |
|  |  | Polyethylene glycol allyl ether | 0 | 0 | 0 | 0 | 0 |
| Content (parts by mass) of (meth)acrylic curable compound relative to 100 parts by mass of the total amount of the curable compound |  |  | 98 | 98 | 98 | 98 | 98 |
| Content (parts by mass) of the component A1 relative to 100 parts by mass of the total amount of the curable compound |  |  | 44 | 44 | 44 | 58 | 58 |
| Content (parts by mass) of the component A2 relative to 100 parts by mass of the total amount of the curable compound |  |  | 23 | 23 | 23 | 0 | 0 |
| Other components | Polymerization initiator | Component B1 | t-Butylperoxyneodecanate (content relative to 100 parts by mass of the total amount of the curable compound: parts by mass) | 1.00 | 1.00 | 1.00 | 1.00 | 1.00 |
|  |  | Component B2 | 1,1,3,3-Tetramethylbutylperoxy-2-ethylhexanate (content relative to 100 parts by mass of the total amount of the curable compound: parts by mass) | 0.30 | 0.50 | 0.60 | 0.30 | 0.10 |
|  | Photochromic pigment |  | Photochromic compound PC1 (content relative to 100 parts by mass of the total amount of the curable compound: parts by mass) | 0.04 | 0.04 | 0.04 | 0.04 | 0.04 |

| | Curable compound | | | Example 6 | Comparative Example 1 | Comparative Example 2 | Comparative Example 3 |
|---|---|---|---|---|---|---|---|
| Curable compound | (Meth)acrylic curable compound | Component A1 | Tripropylene glycol dimethacrylate (3PG), EO/PO average addition mole number 3 | 30 | 30 | 30 | 38 |
|  |  |  | Polyethylene glycol diacrylate (9GA), EO/PO average addition mole number 9 | 14 | 14 | 14 | 19 |
|  |  | Component A2 | Polyethylene glycol diacrylate (14GA), EO/PO average addition mole number 14 | 18 | 18 | 18 | 0 |
|  |  |  | 2,2 Bis[4 methacryloyloxypolyethoxyphenyl]propane (BPE900), EO/PO average addition mole number 17 | 5 | 5 | 5 | 0 |
|  |  | Other than component A1, A2 | (Meth)acryl-amide based monomer (AM-01) | 20 | 20 | 20 | 25 |
|  |  |  | Trimethylolpropane trimethacrylate (TMPT) | 10 | 10 | 10 | 13 |
|  |  |  | Glycidyl methacrylate (GMA) | 1 | 1 | 1 | 1 |
|  | Curable compound other than (meth)acrylic curable compound |  | α Methylstyrene (αMS) | 1 | 1 | 1 | 1 |
|  |  |  | α Methylstyrene dimer (MSD) | 1 | 1 | 1 | 1 |
|  |  |  | Polyethylene glycol allyl ether | 0 | 0 | 0 | 2 |
| Content (parts by mass) of (meth)acrylic curable compound relative to 100 parts by mass of the total amount of the curable compound |  |  |  | 98 | 98 | 98 | 96 |
| Content (parts by mass) of the component A1 relative to 100 parts by mass of the total amount of the curable compound |  |  |  | 44 | 44 | 44 | 57 |
| Content (parts by mass) of the component A2 relative to 100 parts by mass of the total amount of the curable compound |  |  |  | 23 | 23 | 23 | 0 |
| Other components | Polymerization initiator | Component B1 | t-Butylperoxyneodecanate (content relative to 100 parts by mass of the total amount of the curable compound: parts by mass) | 4.00 | 1.00 | 1.00 | 1.00 |
|  |  | Component B2 | 1,1,3,3-Tetramethylbutylperoxy-2-ethylhexanate (content relative to 100 parts by mass of the total amount of the curable compound: parts by mass) | 0.10 | 0.05 | 0.10 | 0.10 |
|  | Photochromic pigment |  | Photochromic compound PC1 (content relative to 100 parts by mass of the total amount of the curable compound: parts by mass) | 0.04 | 0.04 | 0.04 | 0.04 |

Details of the components that are described in Table 1 are as shown below.

Tripropylene glycol dimethacrylate (3PG): NK Ester 3PG manufactured by Shin-Nakamura Chemical Co., Ltd.
Polyethylene glycol diacrylate (9GA): NK Ester A-400 manufactured by Shin-Nakamura Chemical Co., Ltd.
Polyethylene glycol diacrylate (14GA): NK Ester A-600 manufactured by Shin-Nakamura Chemical Co., Ltd.
2,2-Bis[4 methacryloyloxypolyethoxyphenyl]propane (BPE900): NK Ester BPE-900 manufactured by Shin-Nakamura Chemical Co., Ltd.
(Meth)acryl-amide based monomer (AM-01):

Trimethylolpropane trimethacrylate (TMPT): NK Ester TMPT manufactured by Shin-Nakamura Chemical Co., Ltd.
Glycidyl methacrylate (GMA): Light Ester G manufactured by Kyoei Chemical Co., Ltd.
α Methylstyrene (αMS): α-Methylstyrene manufactured by Tokyo Kasei Kogyo Co., Ltd.
α Methylstyrene dimer (MSD): 2,4-Diphenyl-4-methyl-1-pentene manufactured by Tokyo Kasei Kogyo Co., Ltd.
Polyethylene glycol allyl ether: UNIOX PKA-5003 manufactured by NOF CORPORATION
t-Butylperoxyneodecanate: Perbutyl ND manufactured by NOF CORPORATION (10 hour half life temperature—46.4 degrees)
1,1,3,3-Tetramethylbutylperoxy-2-ethylhexanate: Perocta O manufactured by NOF CORPORATION (10 hour half life temperature—65.3 degrees)
Photochromic compound PC1:

[Evaluation of Plastic Lens]
<FT-IR Measurement and Calculation of Absorbance Ratio>

Figure 1:
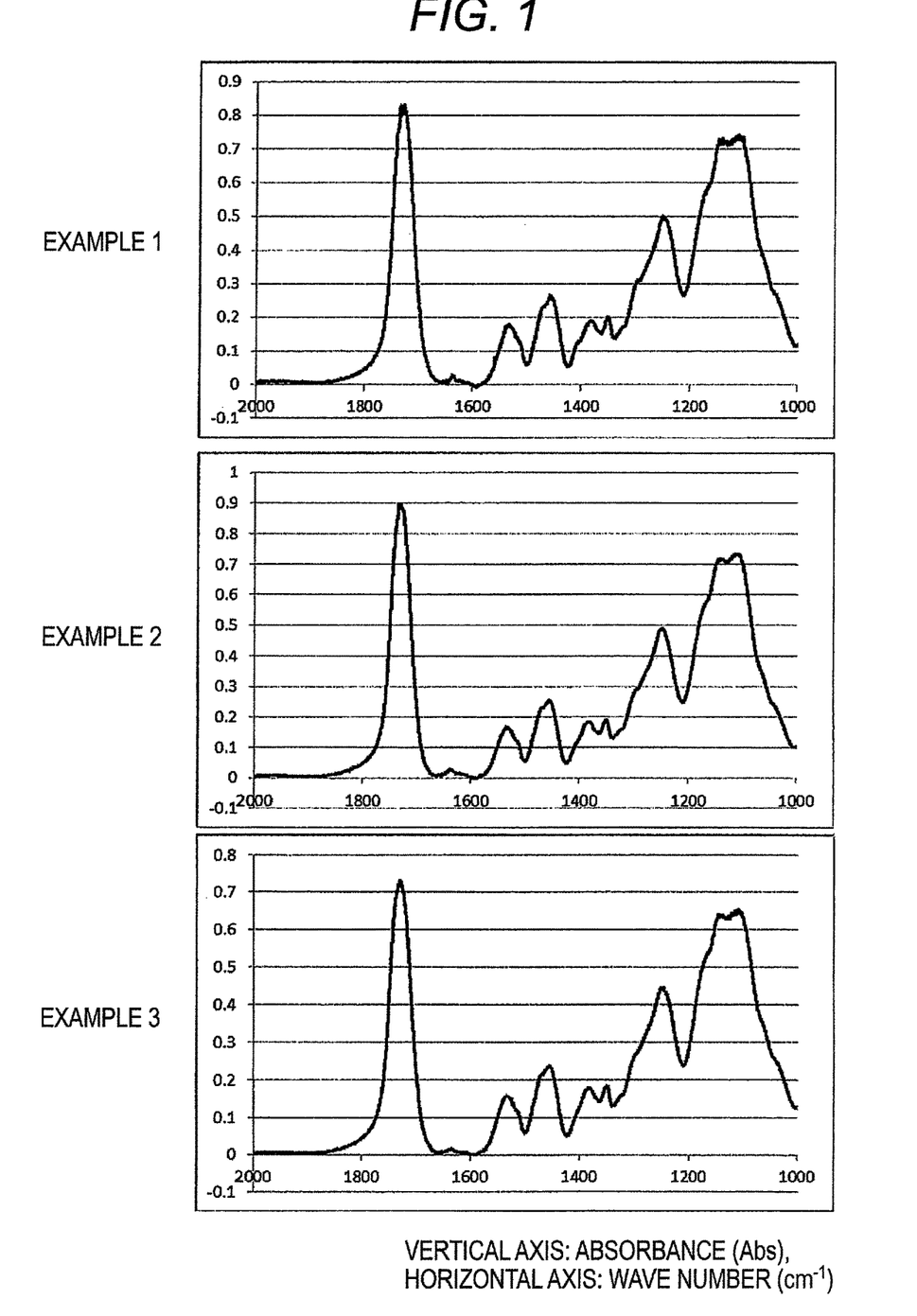
FIG. 1 illustrates an infrared spectrum which is obtained for the plastic lens of Examples 1 to 3 by FT-IR measurement.
Figure 2:
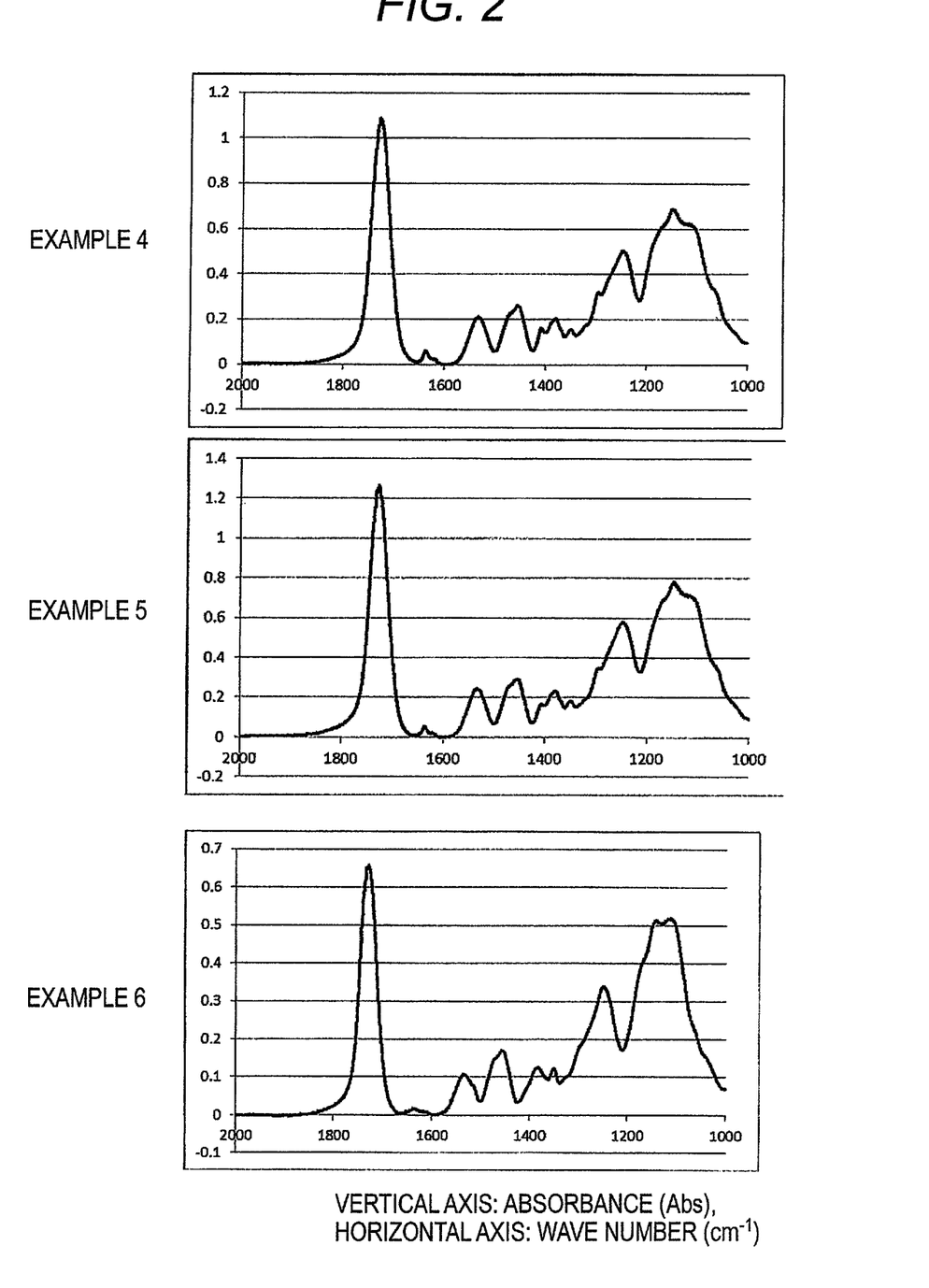
FIG. 2 illustrates an infrared spectrum which is obtained for the plastic lens of Examples 4 to 6 by FT-IR measurement.
Figure 3:
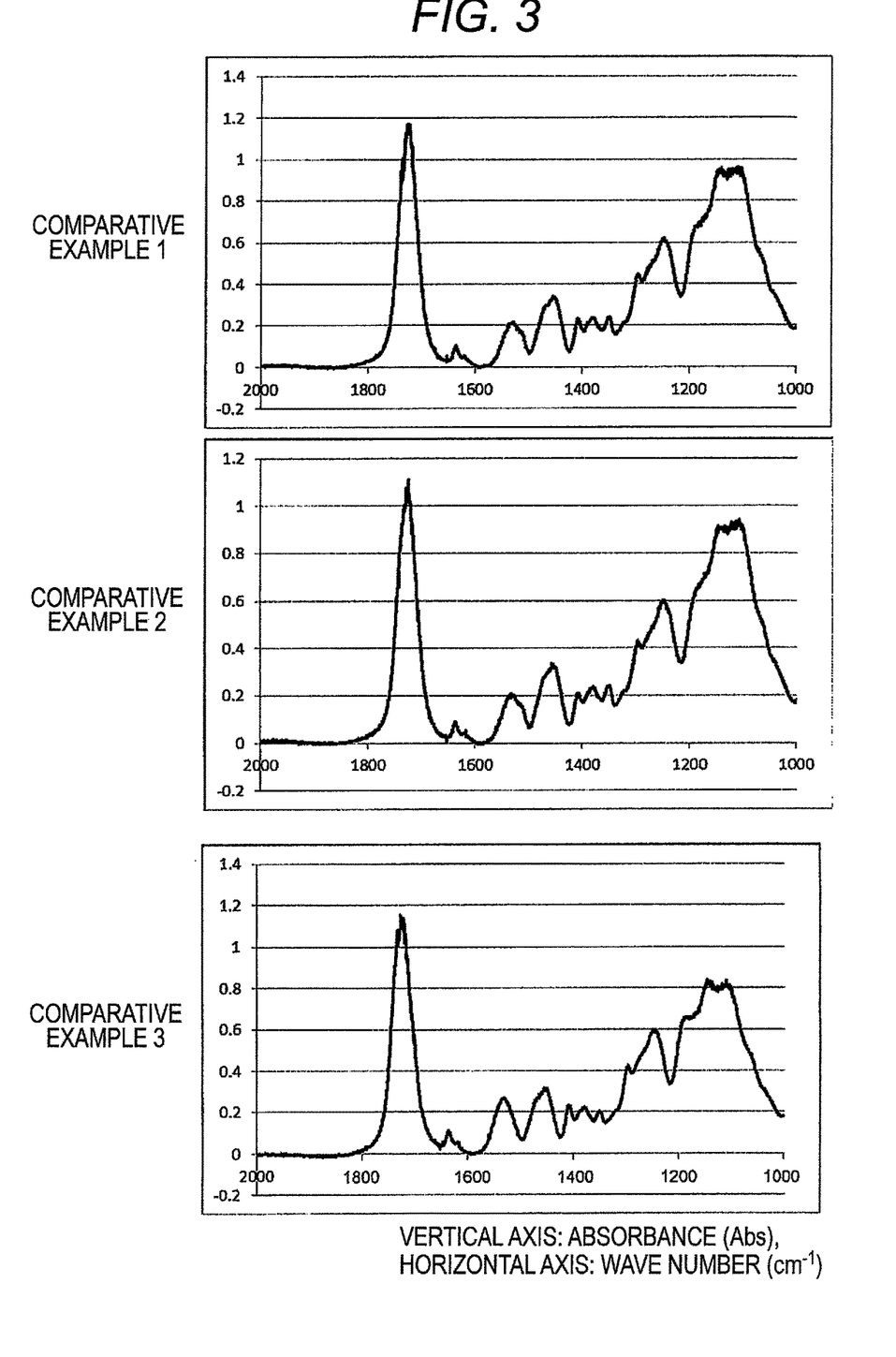
FIG. 3 illustrates an infrared spectrum which is obtained for the plastic lens of Comparative Examples 1 to 3 by FT-IR measurement.

From each plastic lens of Examples and Comparative examples, a sample for measurement (sample piece) was obtained by cutting. By carrying out FT-IR measurement based on KBr method using "Spectrum One" as a FT-IR spectrometer manufactured by Perkin Elmer, an infrared spectrum was obtained. Infrared spectra obtained for the plastic lens of Examples 1 to 3 are shown in FIG. 1. Infrared spectra obtained for the plastic lens of Examples 4 to 6 are shown in FIG. 2. Infrared spectra obtained for the plastic lens of Comparative Examples 1 to 3 are shown in FIG. 3.

From the obtained infrared spectra, the maximum absorbance Abs1 at a wave number of 1680 to 1620 $cm^{-1}$ and the maximum absorbance Abs2 at a wave number of 1800 to 1690 $cm^{-1}$ were read, and then the absorbance ratio was calculated by using the aforementioned Formula 1.

<Evaluation of Surface Damage>

On top of a convex surface of each plastic lens of Examples and Comparative examples, debris derived from the lens itself, which has been generated according to a process of releasing or lens rounding (outer periphery molding die processing), was added. Then, in order to know to the area added with the debris, the lens surface was marked followed by keeping at room temperature. At each moment after a lapse of certain time, the debris added on top of the lens surface was removed by cleaning it with cleaning paper applied with acetone. After carrying out an annealing treatment, the area added with debris was observed by a projection test.

The tiny irregularities which have been described above (surface damage) are observed as a surface defect according to a projection test. Thus, by having transmitted light, which has been irradiated with high pressure mercury lamp, pass through the plastic lens, an image was formed on a white screen so as to determine an occurrence of a surface defect, that is, presence or absence of an occurrence of a surface damage. The elapsed time between the start of keeping and the occurrence of a surface damage is shown in Table 2. In Table 2, if no surface defect (surface damage) is observed even according to observation 72 hours after the keeping, it was expressed as "72 hours <".

The above results are shown in the following Table 2.

TABLE 2

| | Time to have occurrence of surface damage | FT-IR infrared spectrum absorbance ratio |
|---|---|---|
| Example 1 | 72 hours< | 3.3% |
| Example 2 | 72 hours< | 3.1% |
| Example 3 | 72 hours< | 2.6% |
| Example 4 | ≤48 hours | 5.6% |
| Example 5 | ≤72 hours | 4.3% |
| Example 6 | 72 hours< | 2.6% |
| Comparative Example 1 | ≤40 minutes | 8.6% |

TABLE 2-continued

|  | Time to have occurrence of surface damage | FT-IR infrared spectrum absorbance ratio |
|---|---|---|
| Comparative Example 2 | ≤1 hour | 8.1% |
| Comparative Example 3 | ≤40 minutes | 9.5% |

From the results shown in Table 2, it was able to confirm that the plastic lens of Examples in which the absorbance ratio calculated by using the aforementioned Formula 1 is 7.0% or less has suppressed occurrence of a surface damage when compared to the plastic lens of Comparative examples in which the absorbance ratio is more than 7.0%. As a result of observing with a naked eye the surface of a plastic lens which has been confirmed with an occurrence of a surface damage, local swelling was observed in the area added with debris.

Furthermore, with regard to each lens of Examples 1 to 6 which is different from the plastic lens used for surface damage evaluation, an image projected with a high pressure mercury lamp was observed with a naked eye. As a result, it was confirmed that the plastic lens of Examples 1 to 5 shows no surface roughness, but the plastic lens of Example 6 has slight surface roughness to the extent that it does not affect the performance of a spectacle lens (lens base).

<Evaluation of Light Responsiveness of Photochromic Lens (Discoloration Half Life (F1/2))>

According to the conditions including use of a xenon lamp (300 W) light source device, temperature of 23 degrees, and UV intensity of 1.2 mW/cm² as measured by an accumulated irradiance meter, each plastic lens of Examples and Comparative examples (photochromic lens) was allowed to exhibit color for 5 minutes. Then, after terminating the light irradiation, the time required to have a decrease to ½ absorbance at the maximum absorption wavelength (λmax) of a lens is defined as discoloration half life (F1/2). Shorter the time is, faster the discoloration is, that is, better the light responsiveness is.

Light source: Xenon lamp (300 W) device "UIT-501C" manufactured by USHIO Inc.

Accumulated irradiance meter: Accumulated irradiance meter "UIT-102 (light receiving device UVD365PD)" manufactured by USHIO Inc.

Instant multi photometry system: "MCPD-3000" manufactured by Otsuka Electronics Co., Ltd.

The above results are shown in the following Table 3.

TABLE 3

|  | Discoloration half life (F½) |
|---|---|
| Example 1 | 170 seconds |
| Example 2 | 177 seconds |
| Example 3 | 176 seconds |
| Example 4 | 424 seconds |
| Example 5 | 468 seconds |
| Example 6 | 129 seconds |

From the results shown in Table 3, it was able to confirm that the plastic lens (photochromic lens) of Examples 1 to 3 and 6 have more excellent light responsiveness compared to the plastic lens of Examples 4 and 5.

One embodiment of the present disclosure is useful in the field of manufacturing a spectacle lens and spectacles.

It should be understood that the embodiments disclosed herein are illustrative and non-restrictive in every respect. The scope of the present disclosure is defined by the scope of the claims, rather than the description above, and is intended to include any modifications within the scope and meaning equivalent to the scope of the claims.

What is claimed is:

1. A plastic lens obtained by curing a curable composition comprising:
    a radical polymerization initiator B including:
        component B1 that includes a radical polymerization initiator of which 10 hour half life temperature is 30 degrees or higher but lower than 60 degrees, the component B1 being present in an amount of from 4.00 to 5.00 parts by mass relative to 100 parts by mass of a total amount of a curable compound, and
    the curable compound, wherein:
        the curable compound includes 50 parts by mass or more of a (meth)acrylic curable compound relative to 100 parts by mass of the total amount of the curable compound, the (meth)acrylic curable compound includes:
            component A1 that includes at least two polyalkylene glycol (meth)acrylic curable compounds in which an average addition mole number of an alkylene oxide chain selected from ethylene oxide chain and propylene oxide chain is 10 or less, and
            component A2 that includes at least two polyalkylene glycol (meth)acrylic curable compounds in which an average addition mole number of an alkylene oxide chain selected from ethylene oxide chain and propylene oxide chain is within a range of 11 to 30, the component A2 being present in an amount of from 5 to 50 parts by mass relative to 100 parts by mass of the total amount of the curable compound, and
    in the plastic lens, the absorbance ratio of the maximum absorbance Abs1 at a wave number of 1680 to 1620 $cm^{-1}$ relative to the maximum absorbance Abs2 at a wave number of 1800 to 1690 $cm^{-1}$ in an infrared spectrum obtained by measurement with a Fourier transform infrared spectrophotometer is 4.0% or less, as calculated by using the following Formula (1):

Absorbance ratio (%)=(Abs1/Abs2)×100   (1).

2. The plastic lens according to claim 1, wherein an amount of the component A1 is 20 parts by mass or more relative to 100 parts by mass of the total amount of the curable compound.

3. The plastic lens according to claim 1, wherein the curable composition further includes a curable compound containing an ethylenically unsaturated double bond other than the (meth)acrylic curable compound.

4. The plastic lens according to claim 1, wherein an amount of the radical polymerization initiator B is from 1.00 to 6.00 parts by mass relative to 100 parts by mass of the total amount of the curable compound.

5. The plastic lens according to claim 1, wherein the radical polymerization initiator B is an organic peroxide.

6. The plastic lens according to claim 5, wherein the radical polymerization initiator B is a peroxyester compound.

7. The plastic lens according to claim 1, wherein the radical polymerization initiator B further includes component B2: a radical polymerization initiator of which 10 hour half life temperature is 60 degrees or higher but 80 degrees or lower.

8. The plastic lens according to claim 7, wherein an amount of the component B2 is from 0.01 to 1.00 part by mass relative to 100 parts by mass of the total amount of the curable compound.

9. A spectacle lens comprising at least a lens base, wherein the lens base is the plastic lens according to claim 1.

10. Spectacles, which includes the spectacle lens according to claim 9 and a frame having the spectacle lens mounted in.

11. The plastic lens according to claim 1, wherein the average addition mole number of the alkylene oxide chain in the at least two polyalkylene glycol (meth)acrylic curable compounds in the component A1 is from 3 to 9.

12. The plastic lens according to claim 1, wherein the at least two polyalkylene glycol (meth)acrylic curable compounds in the component A1 includes a polyalkylene glycol (meth)acrylic curable compound in which the average addition mole number of the alkylene oxide chain is 3.

13. The plastic lens according to claim 1, wherein an amount of the component A1 is 30 parts by mass or more and 60 parts by mass or less, relative to 100 parts by mass of the total amount of the curable compound.

14. The plastic lens according to claim 1, wherein an amount of the component A1 is 40 parts by mass or more and 60 parts by mass or less, relative to 100 parts by mass of the total amount of the curable compound.

15. The plastic lens according to claim 1, wherein the absorbance ratio is 2.0% or more and 3.5% or less.

16. The plastic lens according to claim 1, wherein the lens is a photochromic lens containing a photochromic pigment.

17. The plastic lens according to claim 1, wherein the at least two polyalkylene glycol (meth)acrylic curable compounds in the component A2 includes 2,2-bis[4-methacryloyloxypolyethoxy-phenyl]propane.

18. The plastic lens according to claim 17, wherein the 2,2-bis[4-methacryloyloxypolyethoxyphenyl]propane has an average addition mole number of 17.

19. The plastic lens according to claim 17, wherein the curable compound includes only one (meth)acrylic curable compound that consists of the component A1, the component A2, a (meth)acryl-amide based curable compound, and trimethylolpropane trimethacrylate.

\* \* \* \* \*